United States Patent

Yanari

[11] Patent Number: 5,774,270
[45] Date of Patent: Jun. 30, 1998

[54] WIDE-FIELD EYEPIECE LENS

[75] Inventor: Mitsuhiro Yanari, Mitaka, Japan

[73] Assignee: Nikon Corporation, Tokyo, Japan

[21] Appl. No.: 663,449

[22] Filed: Jun. 13, 1996

[30] Foreign Application Priority Data

Jun. 15, 1995 [JP] Japan .................................. 7-174204

[51] Int. Cl.$^6$ ................................................... G02B 25/00
[52] U.S. Cl. ........................................................ 359/644
[58] Field of Search ................................. 359/644, 643, 359/771, 774, 783

[56] References Cited

U.S. PATENT DOCUMENTS

| | | | |
|---|---|---|---|
| 3,384,434 | 5/1968 | Scidmore et al. | 359/644 |
| 3,464,764 | 9/1969 | Scidmore et al. | 359/734 |
| 3,586,418 | 6/1971 | Abe | 359/644 |
| 4,099,842 | 7/1978 | Kaneko | 359/644 |
| 4,497,546 | 2/1985 | Kobayashi | 359/644 |
| 4,792,214 | 12/1988 | Wickholm et al. | 359/770 |

FOREIGN PATENT DOCUMENTS

| | | | |
|---|---|---|---|
| 4013798-A1 | 1/1991 | Germany | 359/643 |
| 35-16771 | 3/1957 | Japan . | |
| 46-41508 | 12/1971 | Japan . | |
| 48-3751 | 1/1973 | Japan . | |
| 55-52014 (A) | 4/1980 | Japan . | |
| 61-228411 (A) | 10/1986 | Japan . | |
| 175966 | 4/1922 | United Kingdom . | |

*Primary Examiner*—Georgia Y. Epps
*Assistant Examiner*—Jordan M. Schwartz
*Attorney, Agent, or Firm*—Klarquist Sparkman Campbell Leigh & Whinston, LLP

[57] ABSTRACT

An eyepiece lens suitable for use in microscopes, binoculars, and the like is disclosed. The eyepiece lens provides a large eye relief of more than 80 percent of the focal length of the eyepiece lens in an apparent field of view of more than 60 degrees, preferably more than 70 degrees, while favorably correcting various aberrations such as distortion up to the perimeter of the apparent field of view of the eyepiece lens. The eyepiece lens is disposed on the eye side of a real image plane of an objective lens with which the eyepiece lens is used, and comprises, in order from the objective side, a first cemented lens $L_1$, preferably a doublet, a second cemented lens $L_2$, preferably a doublet, a first positive lens element $L_3$, and a second positive lens element $L_4$. The eyepiece lens preferably satisfies a number of quantitative conditions.

20 Claims, 4 Drawing Sheets

WIDE-FIELD EYEPIECE LENS

FIELD OF THE INVENTION

This invention pertains to eyepiece lenses used in telescopic optical systems, such as binoculars, and to eyepiece lenses used in microscopes; it particularly relates to eyepiece lenses, as used in such optical systems, having a wide apparent field of view.

BACKGROUND OF THE INVENTION

In order to easily observe the entire apparent field of view obtainable with an optical system comprising an objective lens and using an eyepiece lens, it is desirable for the distance, with respect to the eyepiece lens, between the eyepoint and the apex of the lens surface closest to the eye (hereafter referred to as the "eye relief") to be 80 percent or more of the focal length of the eyepiece lens.

However, in general, while favorably correcting aberrations in the area of the apparent field of view, the more the apparent field of view of an eyepiece lens is enlarged, the smaller the eye relief becomes. Furthermore, increasing the eye relief while maintaining uniformity of the apparent field of view generally requires that the diameter of the eyepiece lens be made larger, which usually causes various aberrations in the area of the apparent field of view, such as coma, astigmatism, chromatic aberration, and distortion, to noticeably worsen. I.e., it is difficult to enlarge both the apparent field of view and the eye relief of an eyepiece lens simultaneously.

The Erfle-type eyepiece lens has long been known for use in telescopes, microscopes, and the like. With lenses of such type having an apparent field of view of about 60 degrees, favorable correction of aberrations is possible; but, in general, it is not easy to increase eye relief with such eyepiece lenses. With an Erfle-type eyepiece lens having an apparent field of view of more than 70 degrees, it has been difficult to obtain an eye relief that is more than 80 percent of the focal length while favorably correcting the various aberrations in the entire apparent field of view of the eyepiece lens.

SUMMARY OF THE INVENTION

The present invention overcomes the foregoing difficulties by providing, inter alia, a wide-field eyepiece lens having an eye relief of more than 80 percent of the focal length of the eyepiece lens at an apparent field of view of more than 60 degrees, and even more ideally at an apparent field of view of more than 70 degrees, while simultaneously providing favorable correction of various aberrations up to the periphery of the apparent field of view of the eyepiece lens.

According to another aspect of the present invention, an eyepiece lens according to the present invention minimally comprises, in order from the objective side, a first cemented lens $L_1$, a second cemented lens $L_2$, a first positive lens element $L_3$, and a second positive lens element $L_4$. The first cemented lens $L_1$ is preferably constructed of two lens elements cemented together: preferably, from the objective side, a negative lens element cemented to a positive lens element. The second cemented lens $L_2$ is preferably constructed of, from the objective side, a positive lens element cemented to a negative lens element, or a negative lens element cemented to a positive lens element. The eyepiece lens can be disposed closer to a user's eye than to a real-image plane of an objective lens with which the eyepiece lens is used.

According to yet another aspect of the present invention, the lens surface in the first cemented lens $L_1$ that is closest to the objective side is a concave or planar surface having a radius of curvature $R_1$ (if the surface is planar, then $R_1$ is infinity); and the lens surface in the first cemented lens $L_1$ that is closest to the eye side has a radius of curvature $R_3$. Such an eyepiece lens preferably satisfies the following conditions:

$-0.7 \leq F/R_1 \leq 0$, $-1.0 \leq F/R_3 \leq 0$, $|R_3|/|R_1| \leq 1.4$, and $D/F \leq 2$.

wherein F is the overall focal length of the eyepiece lens and D is the overall length of the eyepiece lens (the distance between the lens surface in the eyepiece lens closest to the objective side and the lens surface in the eyepiece lens closest to the eye side).

According to yet another aspect of the present invention, the first positive lens element $L_3$ has a focal length $F_3$ and a convex surface oriented toward the objective side, and the second positive lens element $L_4$ has a focal length $F_4$ and a convex surface oriented toward the objective side. In addition, wherein the radius of curvature of the cemented surface of the first cemented lens $L_1$ is $R_2$ and the radius of curvature of the cemented surface of the second cemented lens $L_2$ is $R_5$, the eyepiece lens preferably further satisfies the following conditions whenever the second cemented lens $L_2$ is constructed of, from the objective side, a positive lens element cemented to a negative lens element:

$0.3 \leq F/R_2 \leq 1.3$, $-1.3 \leq F/R_5 \leq -0.3$, $2.5 \leq |R_4|/F$, $0.2 \leq F/F_4 \leq 0.7$, and $0.3 \leq F_3/F_4 \leq 8.5$.

Alternatively to satisfying the condition: $-1.3 \leq F/R_5 \leq -0.3$, the eyepiece lens satisfies the following condition whenever the second cemented lens $L_2$ is constructed of, from the objective side, a negative lens element cemented to a positive lens element:

$0.3 \leq F/R_5 \leq 1.3$.

The foregoing and other aspects of the present invention shall be readily apparent from the following detailed description, drawings, and claims.

DETAILED DESCRIPTION

Figure 1:
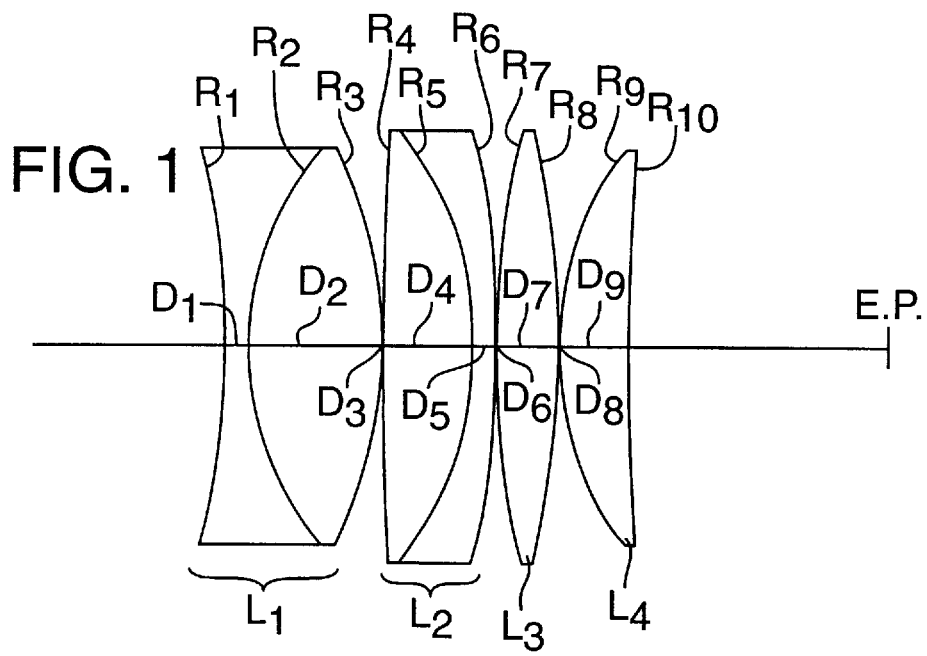
FIG. 1 is an optical schematic diagram showing general aspects of an eyepiece lens according to the present invention as well as specific aspects of the first example embodiment (note, E.P. denotes eyepoint).
Figure 2A:
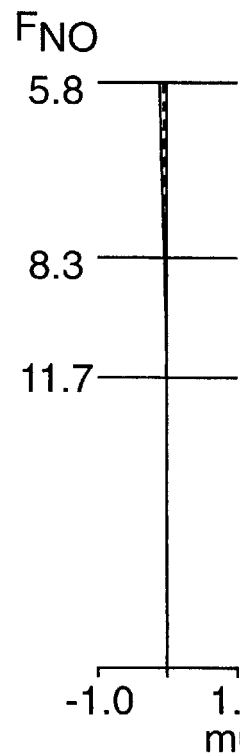
FIGS. 2A–2C are plots of spherical aberration, astigmatism, and distortion, respectively, for an eyepiece lens according to the first example embodiment.
Figure 2B:
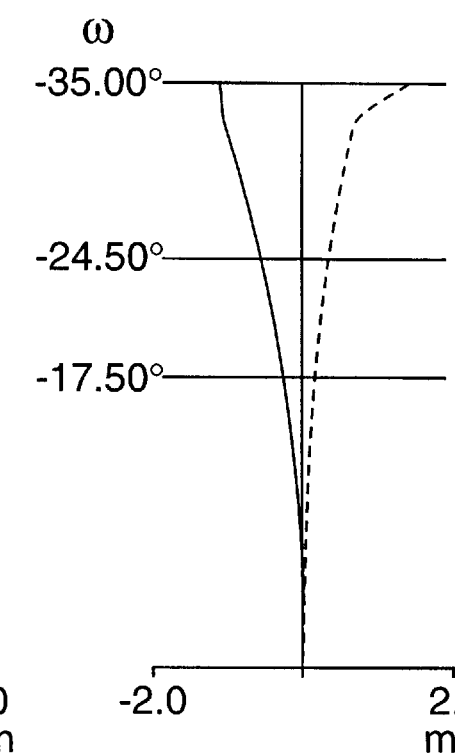
Figure 2C:
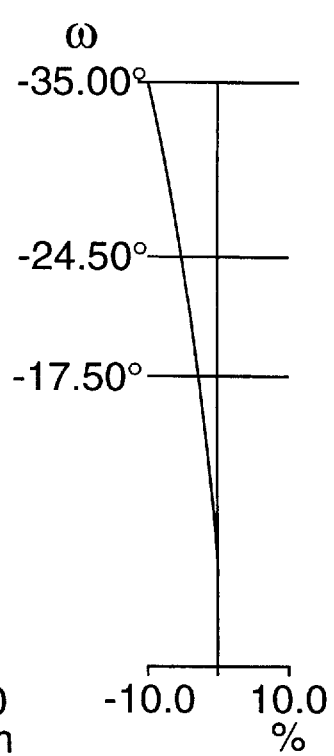
Figure 3:
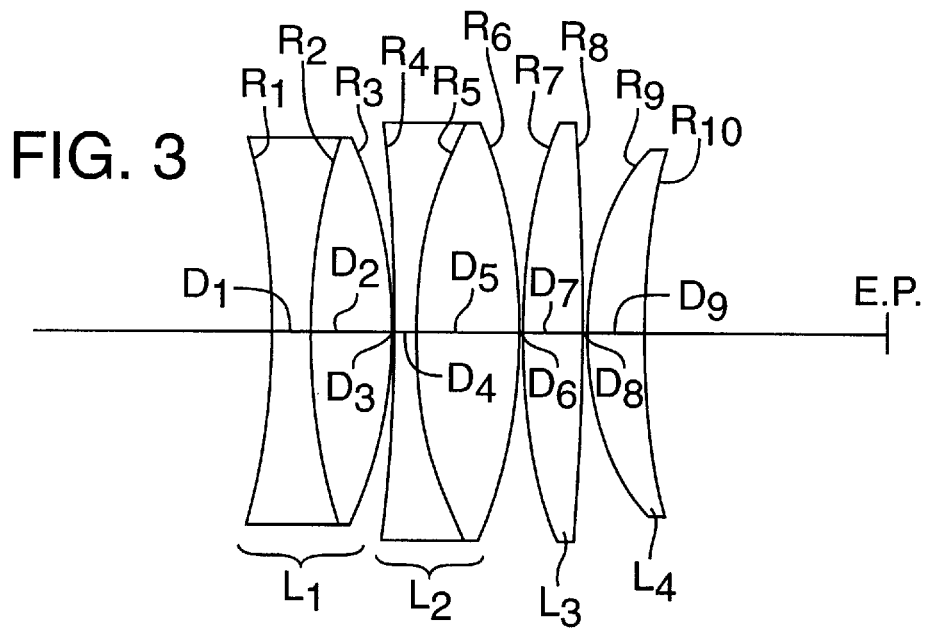
FIG. 3 is an optical schematic diagram showing specific aspects of the second example embodiment.
Figure 4A:
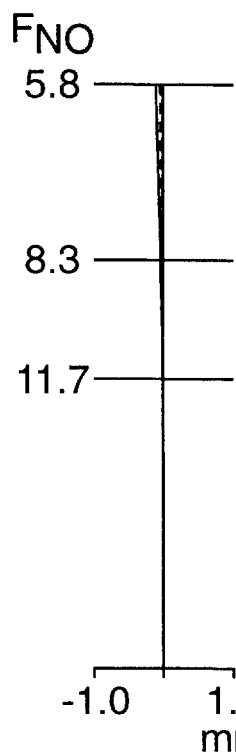
FIGS. 4A–4C are plots of spherical aberration, astigmatism, and distortion, respectively, for an eyepiece lens according to the second example embodiment.
Figure 4B:
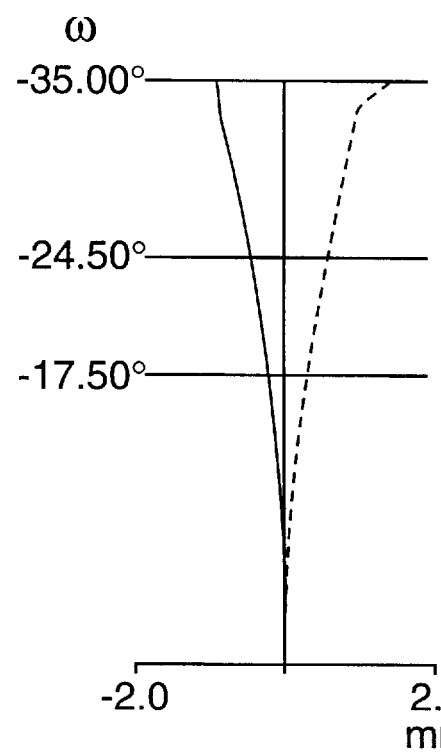
Figure 4C:
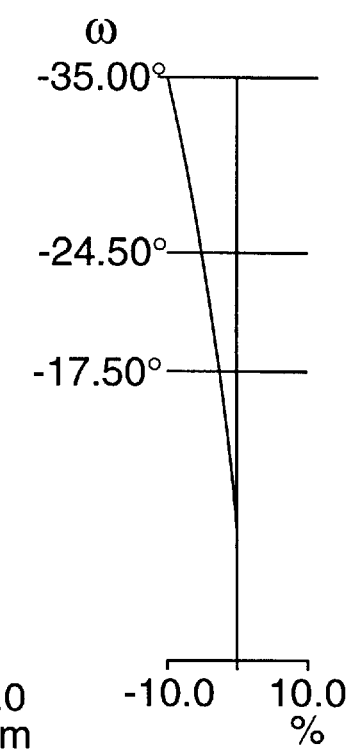
Figure 5:
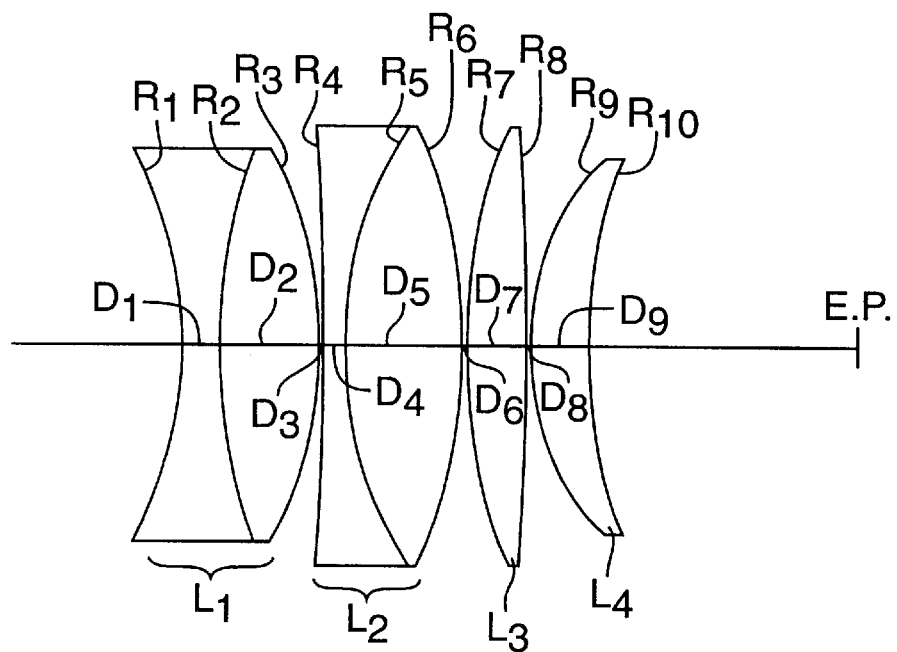
FIG. 5 is an optical schematic diagram showing specific aspects of the third example embodiment.
Figure 6A:
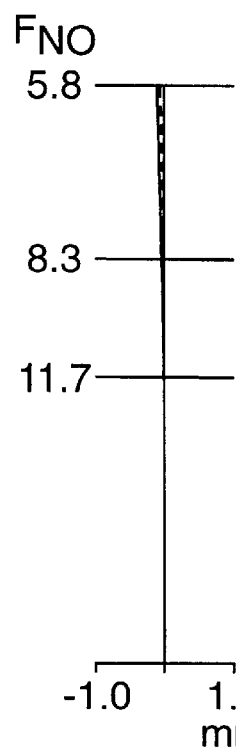
FIGS. 6A–6C are plots of spherical aberration, astigmatism, and distortion, respectively, for an eyepiece lens according to the third example embodiment.
Figure 6B:
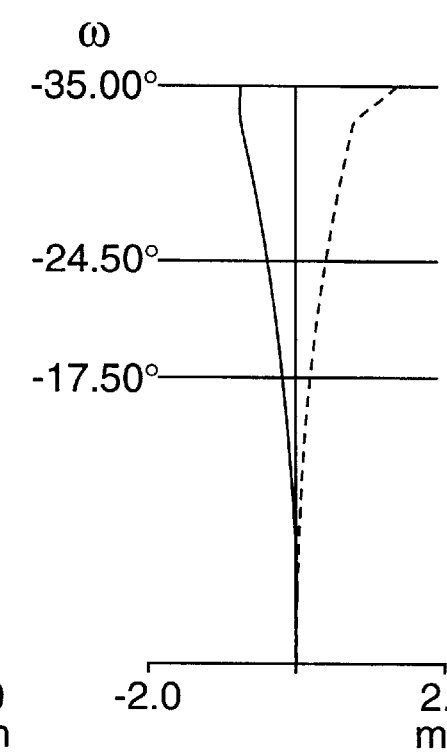
Figure 6C:
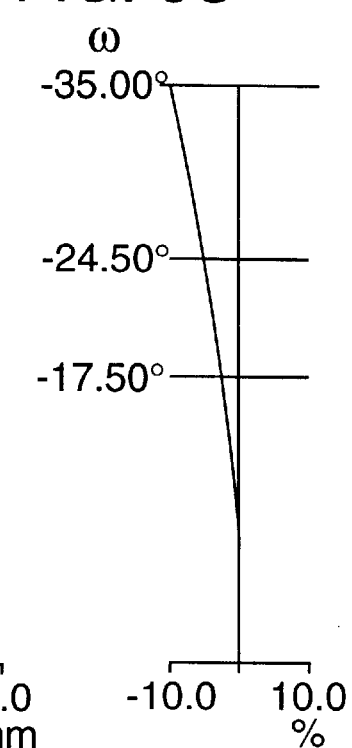
Figure 7:
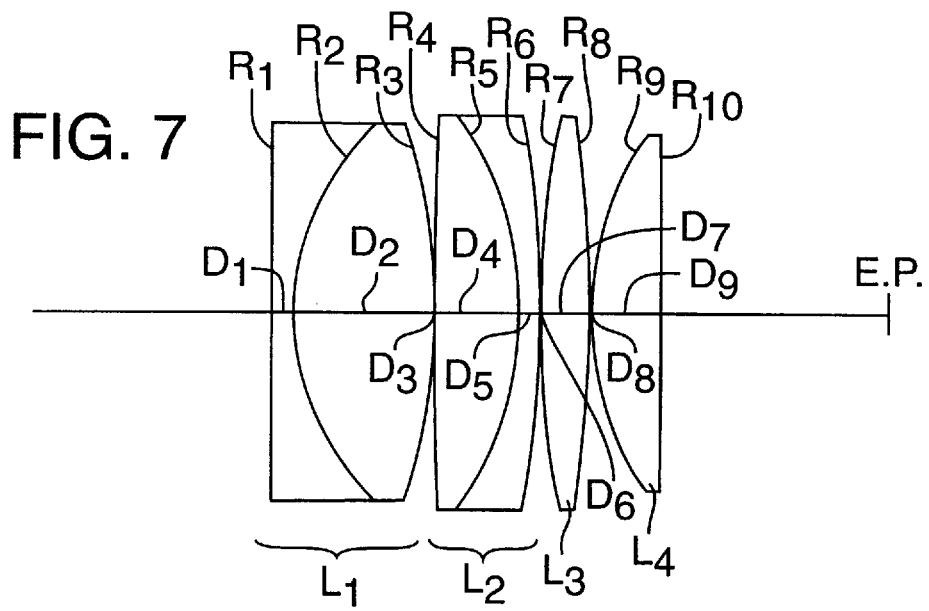
FIG. 7 is an optical schematic diagram showing specific aspects of the fourth example embodiment.
Figure 8A:
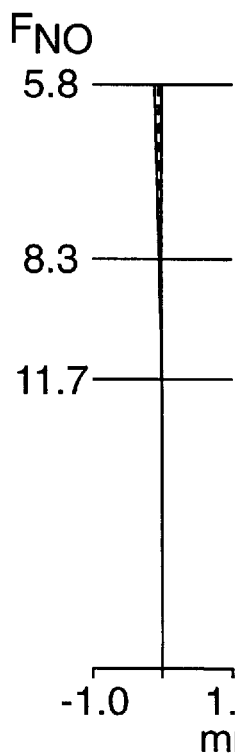
FIGS. 8A–8C are plots of spherical aberration, astigmatism, and distortion, respectively, for an eyepiece lens according to the fourth example embodiment.
Figure 8B:
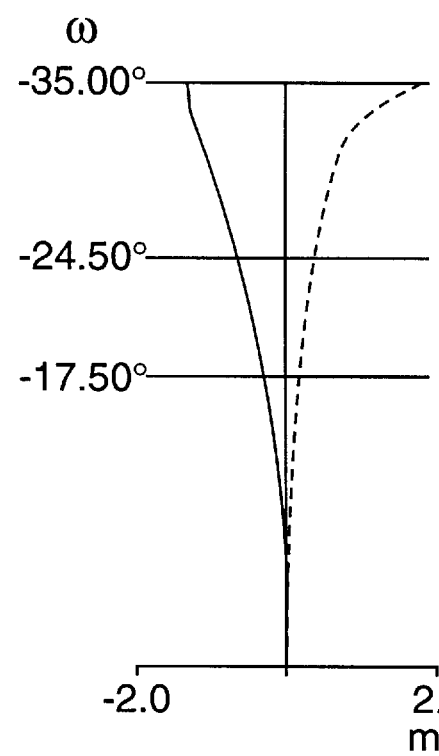
Figure 8C:
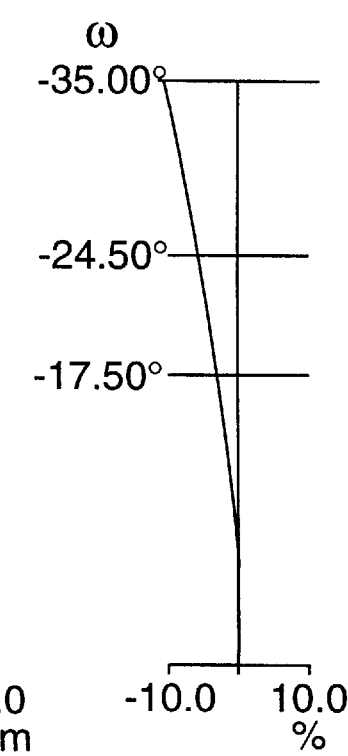

According to the present invention, an eyepiece lens is provided having a wide apparent field of view and that can be disposed closer to the eye than to the real image plane of the objective lens (objective) with which the eyepiece lens is used. As depicted generally in FIG. 1, the eyepiece lens comprises, in order from the objective side (left side), a first cemented lens $L_1$ constructed of two lens elements cemented together, a second cemented lens $L_2$ constructed of two lenses cemented together, a first positive lens element $L_3$, and a second positive lens element $L_4$.

The first cemented lens $L_1$ is preferably constructed of, in order from the objective side, a negative lens element cemented to a positive lens element. The second cemented lens is preferably constructed of, in order from the objective side, a positive lens element cemented to a negative lens element, or a negative lens element cemented to a positive lens element.

The first cemented lens $L_1$ has a concave or planar surface $R_1$ oriented toward the objective side. The first cemented lens $L_1$ preferably satisfies the following conditions:

$$-0.7 \leq F/R_1 \leq 0 \tag{1}$$

$$-1.0 \leq F/R_3 \leq 0 \tag{2}$$

$$|R_3|/|R_1| \leq 1.4 \tag{3}$$

$$D/F \leq 2 \tag{4}$$

wherein F is the overall focal length of the eyepiece lens; D is the overall axial length of the eyepiece lens; $R_1$ is the curvature radius of the lens surface, in the first cemented lens $L_1$, that is closest to the objective side; and $R_3$ is the curvature radius of the lens surface, in the first cemented lens $L_1$, that is closest to the eye side (see, e.g., FIG. 1).

Since the overall focal length F of the eyepiece lens is greatest in cases when a sufficiently large eye relief can be ensured, even when the eye relief is about 80 percent of the overall focal length F, the lens surface $R_1$ can be convex. However, in an eyepiece lens where the overall focal length F is relatively small, it is desirable for the surface $R_1$ to be concave or at least planar in order to obtain an eye relief of more than 80 percent of F (0.8 F) while favorably correcting the various aberrations.

When the first positive lens element $L_3$ and the second positive lens element $L_4$ are both positive and each has a convex surface oriented toward the objective side, and the second cemented lens $L_2$ is constructed of, from the objective side, a positive lens element cemented to a negative lens element, the following conditions are preferably satisfied:

$$0.3 \leq F/R_2 \leq 1.3 \tag{5}$$

$$-1.3 \leq F/R_5 \leq -0.3 \tag{6a}$$

$$2.5 \leq |R_4|/F \tag{7}$$

$$0.2 \leq F/F_4 \leq 0.7 \tag{8}$$

$$0.3 \leq F_3/F_4 \leq 8.5 \tag{9}$$

wherein $F_3$ and $F_4$ are the focal lengths of the first positive lens element $L_3$ and the second positive lens element $L_4$, respectively, $R_2$ and $R_5$ are the curvature radii of the cemented surfaces of the first cemented lens $L_1$ and the second cemented lens $L_2$, respectively, and $R_4$ is the curvature radius of the lens surface, of the second cemented lens $L_2$, that is closest to the objective side.

When the second cemented lens $L_2$ is constructed of, in order from the objective side, a negative lens element cemented to a positive lens element, the following condition is preferably satisfied instead of condition (6a):

$$0.3 \leq F/R_5 \leq 1.3 \tag{6b}$$

In condition (1), orientation of a concave or planar surface $R_1$ toward the objective side makes it possible to increase the eye relief of the eyepiece lens by shifting the principal point of the eyepiece lens further toward the eye. If the ratio of $F/R_1$ were to fall below the lower limit of condition (1), then the rear principal point of the eyepiece lens would be situated too far rearwardly (toward the eye), and the surface $R_1$ would be situated too close to the image plane of the objective. This could cause any flaws or dust on the surface $R_1$ to be unacceptably noticeable to the observer viewing through the eyepiece lens, and could require excessive enlargement of lens diameters of the eyepiece lens from the first cemented lens $L_1$ on rearwardly, thereby rendering favorable correction of the various aberrations difficult. If the upper limit of condition (1) were to be exceeded, then the surface $R_1$ would be convex; correction of aberrations would be relatively easy, but it would be unacceptably difficult to obtain an eye relief greater than 80 percent of the overall focal length of the eyepiece lens at an apparent field of view of more than 60 degrees, or preferably more than 70 degrees.

In order to obtain especially favorable correction of the various aberrations while ensuring an acceptably long eye relief in the apparent field of view of the eyepiece lens, it is desirable that the lower limit of conditional expression (1) be −0.6.

With respect to condition (2), if $F/R_3$ were to exceed the upper limit, even when condition (3) is still satisfied, then the positive refractive power of the first cemented lens $L_1$ would be unacceptably weak. Thus, whereas it would be possible to achieve a satisfactorily long eye relief, the diameter of the lenses situated on the eye side of the first cemented lens $L_1$ (i.e., the lenses $L_2$–$L_4$) would have to be unacceptably large, and correction of aberrations would be difficult because it would be necessary to strengthen the positive refractive power of these lenses. If $F/R_3$ were to fall below the lower limit of condition (2), then aberration correction would be relatively easy since the positive refractive power of the first cemented lens $L_1$ would be strengthened, making it possible to weaken the positive refractive power of the lenses situated on the eye side of the first cemented lens $L_1$; but, it would be difficult to obtain an eye relief of more than 80 percent of the focal length of the eyepiece lens.

Further with respect to condition (2), it is especially preferable that the lower limit be −0.8 and the upper limit be −0.3.

If the upper limit of condition (3) were to be exceeded even while still satisfying conditions (1) and (2), then the negative refractive power of the first cemented lens $L_1$ would be stronger, thus increasing the eye relief of the eyepiece lens. However, such a situation would necessitate excessive enlargement of the diameter of the lenses situated on the eye side of the first cemented lens $L_1$ (i.e., lenses $L_2$–$L_4$); moreover, since it would be necessary to strengthen the positive refractive power of the lenses $L_2$–$L_4$, aberration correction would be unacceptably difficult.

Further with respect to condition (3), it is especially preferred that the upper limit be 1.15.

Condition (4) pertains to the overall length of the eyepiece lens. If the upper limit were to be exceeded, then the overall length of the eyepiece lens would be unacceptably long, rendering it unacceptably difficult to obtain an eye relief that is more than 80 percent of the focal length of the eyepiece lens. This would also make it unacceptably difficult to correct aberrations since the diameter of the lenses in the eyepiece lens that would be required to obtain a satisfactory eye relief would be excessively large. This, in turn, would place the surface $R_1$ too close to the image plane of the objective, which could cause any flaws or debris on the surface $R_1$ to be unacceptably noticeable to the observer viewing through the eyepiece lens.

Conditions (5), (6a), and (6b) pertain to obtaining favorable correction of lateral chromatic aberration and coma over the entire apparent field of view of the eyepiece lens. Falling below the lower limit of conditions (5) or (6b), or exceeding the upper limit of condition (6a), would cause chromatic aberrations in the area of the periphery of the field of view and half-field of the eyepiece lens to be insufficiently correctable with currently available glass materials. Exceeding the upper limit of conditions (5) or (6b), or falling below the lower limit of condition (6a), would lower the correctability of asymmetrical aberrations, especially coma aberration, of the eyepiece lens due to excessive decreases in $|R_2|$ and $|R_5|$.

With respect to conditions (5) and (6b), it is especially preferred that the lower limit be 0.35 and the upper limit be 1.1. With respect to condition (6a), it is especially preferred that the lower limit be −1.1, and the upper limit be −0.35.

Condition (7) pertains to the length of eye relief obtainable with the eyepiece lens and to the correctability of various aberrations, especially astigmatism and distortion. If $R_4$ were positive and $|R_4|/F$ were to fall below the lower limit of condition (7), then the surface $R_4$ would be too positively refractive (too convergent); whereas this would make it possible to weaken the positive refractive power of the lenses situated on the eye side of the second cemented lens $L_2$ in the eyepiece lens and thus improve the correctability of aberrations, it would be difficult to obtain an eye relief of more than 80 percent of the focal length F of the eyepiece lens in an apparent field of view of more than 60 degrees. If $R_4$ were negative and $|R_4|/F$ were to fall below the lower limit of condition (7), then the surface $R_4$ would be too negatively refractive (too divergent); whereas this would make it easier to obtain an eye relief of more than 80 percent of the focal length F of the eyepiece lens at an apparent field of view of more than 60 degrees, the diameters of the lenses situated on the eye side of the second cemented lens $L_2$ in the eyepiece lens would have to be excessively enlarged and the positive refractive powers of these lenses would have to be unacceptably increased for satisfactory correction of aberrations.

Further with respect to condition (7), it is especially preferable that the lower limit be 4.

With respect to conditions (8) and (9), if $F_3/F_4$ were to fall below the lower limit of condition (9) even while still satisfying condition (8), then the positive refractive power of the first positive lens element $L_3$ would be too strong; this would make obtaining an eye relief of more than 80 percent of the focal length F and favorable correction of aberrations (especially distortion) of the eyepiece lens unacceptably difficult. In general, if $F_3/F_4$ were to exceed the upper limit of condition (9), then the positive refractive power of the first positive lens element $L_3$ would be unacceptably weak.

Further with respect to condition (9), it is especially preferred that the lower limit be 0.5 and the upper limit be 4.

With respect to condition (8), if $F/F_4$ were to fall below the lower limit, then the positive refractive power of the second positive lens element $L_4$ would be too weak to favorably correct various aberrations, especially distortion, at the perimeter of the apparent field of view of the eyepiece lens. If the upper limit of condition (8) were to be exceeded, then the positive refractive power of the second positive lens element $L_4$ would be too strong, and correction of aberrations exhibited by the eyepiece lens, particularly astigmatism and coma, would be unacceptably difficult.

EXAMPLE EMBODIMENTS

FIGS. 1, 3, 5, and 7 provide optical diagrams of eyepiece lenses according to example embodiments 1–4, respectively, of the present invention. The eyepiece lens of each example embodiment comprises, in order from the objective side, a first cemented lens $L_1$ constructed of two lens elements cemented together, a second cemented lens $L_2$ constructed of two lens elements cemented together, a first positive lens element $L_3$, and a second positive lens element $L_4$.

In the example embodiments, the first cemented lens $L_1$ is constructed, from the objective side, of a negative lens element cemented to a positive lens element. In the first and fourth example embodiments, the second cemented lens $L_2$ is constructed, from the objective side, of a positive lens element cemented to a negative lens element; in the second and third example embodiments, the second cemented lens $L_2$ is constructed, from the objective side, of a negative lens element cemented to a positive lens element. With respect to the first cemented lens $L_1$, the negative lens element in example embodiments 1–3 has a concave surface oriented toward the objective side, and in example embodiment 4 has a planar surface oriented toward the objective side. Furthermore, in example embodiments 1–4, each of the first positive lens element $L_3$ and the second positive lens element $L_4$ has a convex surface oriented toward the objective side.

Tables 1–4 below provide optical data for example embodiments 1–4, respectively, including values of each of the conditions (1)–(9). In each table, R is the curvature radius of a lens surface in mm, D is the interfacial distance in mm, and $n_d$ and $\nu_d$ are the refractive index and Abbe number, respectively, as measured with d line light.

TABLE 1

| Surface No. | R | D | $n_d$ | $\nu_d$ |
|---|---|---|---|---|
| 1 | −50.000 | 1.50 | 1.80458 | 25.50 |
| 2 | 21.000 | 9.00 | 1.62041 | 60.14 |
| 3 | −33.000 | 0.20 | | |
| 4 | 300.000 | 6.00 | 1.71300 | 53.93 |
| 5 | −25.000 | 1.50 | 1.80458 | 25.50 |
| 6 | −80.000 | 0.20 | | |
| 7 | 71.500 | 4.00 | 1.71300 | 53.93 |

TABLE 1-continued

| | | | | |
|---|---|---|---|---|
| 8 | −71.500 | 0.20 | | |
| 9 | 23.500 | 4.70 | 1.62041 | 60.14 |
| 10 | 357.585 | | | |

| | |
|---|---|
| Eye relief = 17.1 mm | $F_3$ = 50.7 mm |
| F = 17.5 mm | $F_4$ = 40.3 mm |

Values of conditions:

| | |
|---|---|
| (1) | $F/R_1$ = −0.35 |
| (2) | $F/R_3$ = −0.53 |
| (3) | $|R_3|/|R_1|$ = 0.66 |
| (4) | D/F = 1.56 |
| (5) | $F/R_2$ = 0.83 |
| (6a) | $F/R_5$ = −0.70 |
| (7) | $|R_4|/F$ = 17.14 |
| (8) | $F/F_4$ = 0.43 |
| (9) | $F_3/F_4$ = 1.26 |

TABLE 2

| Surface No. | R | D | $n_d$ | $v_d$ |
|---|---|---|---|---|
| 1 | −50.000 | 2.50 | 1.80458 | 25.50 |
| 2 | 45.000 | 5.50 | 1.62041 | 60.14 |
| 3 | −34.500 | 0.20 | | |
| 4 | −150.000 | 1.50 | 1.80458 | 25.50 |
| 5 | 30.000 | 7.00 | 1.71300 | 53.93 |
| 6 | −41.000 | 0.20 | | |
| 7 | 43.383 | 4.00 | 1.71300 | 53.93 |
| 8 | −300.000 | 0.20 | | |
| 9 | 20.000 | 4.00 | 1.71300 | 53.93 |
| 10 | 54.312 | | | |

| | |
|---|---|
| Eye relief = 16.1 mm | $F_3$ = 53.4 mm |
| F = 17.5 mm | $F_4$ = 42.3 mm |

Values of conditions:

| | |
|---|---|
| (1) | $F/R_1$ = −0.35 |
| (2) | $F/R_3$ = −0.51 |
| (3) | $|R_3|/|R_1|$ = 0.69 |
| (4) | D/F = 1.43 |
| (5) | $F/R_2$ = 0.39 |
| (6a) | $F/R_5$ = 0.58 |
| (7) | $|R_4|/F$ = 8.57 |
| (8) | $F/F_4$ = 0.41 |
| (9) | $F_3/F_4$ = 1.26 |

TABLE 3

| Surface No. | R | D | $n_d$ | $v_d$ |
|---|---|---|---|---|
| 1 | −30.000 | 2.50 | 1.80458 | 25.50 |
| 2 | 45.000 | 6.80 | 1.62041 | 60.14 |
| 3 | −31.000 | 0.20 | | |
| 4 | −250.000 | 1.50 | 1.80458 | 25.50 |
| 5 | 30.000 | 8.00 | 1.71300 | 53.93 |
| 6 | −39.000 | 0.20 | | |
| 7 | 43.383 | 4.20 | 1.71300 | 53.93 |
| 8 | −150.000 | 0.20 | | |
| 9 | 20.000 | 4.00 | 1.71300 | 53.93 |
| 10 | 38.359 | | | |

| | |
|---|---|
| Eye relief = 18.1 mm | $F_3$ = 47.6 mm |
| F = 17.5 mm | $F_4$ = 53.7 mm |

Values of conditions:

| | |
|---|---|
| (1) | $F/R_1$ = −0.58 |
| (2) | $F/R_3$ = −0.56 |
| (3) | $|R_3|/|R_1|$ = 1.03 |

TABLE 3-continued

| | |
|---|---|
| (4) | D/F = 1.58 |
| (5) | $F/R_2$ = 0.39 |
| (6b) | $F/R_5$ = 0.58 |
| (7) | $|R_4|/F$ = 14.29 |
| (8) | $F/F_4$ = 0.33 |
| (9) | $F_3/F_4$ = 0.89 |

TABLE 4

| Surface No. | R | D | $n_d$ | $v_d$ |
|---|---|---|---|---|
| 1 | ∞ | 1.50 | 1.80458 | 25.50 |
| 2 | 18.000 | 9.50 | 1.62041 | 60.14 |
| 3 | −44.000 | 0.20 | | |
| 4 | 500.000 | 5.50 | 1.71300 | 53.93 |
| 5 | −25.000 | 1.50 | 1.80458 | 25.50 |
| 6 | −80.000 | 0.20 | | |
| 7 | 80.000 | 3.00 | 1.71300 | 53.93 |
| 8 | −119.000 | 0.20 | | |
| 9 | 21.500 | 4.70 | 1.62041 | 60.14 |
| 10 | −963.517 | | | |

| | |
|---|---|
| Eye relief = 15.0 mm | $F_3$ = 67.5 mm |
| F = 17.5 mm | $F_4$ = 34.0 mm |

Values of conditions:

| | |
|---|---|
| (1) | $F/R_1$ = 0.00 |
| (2) | $F/R_3$ = −0.40 |
| (3) | $|R_3|/|R_1|$ = 0.00 |
| (4) | D/F = 1.50 |
| (5) | $F/R_2$ = 0.97 |
| (6a) | $F/R_5$ = −0.70 |
| (7) | $|R_4|/F$ = 28.57 |
| (8) | $F/F_4$ = 0.51 |
| (9) | $F_3/F_4$ = 1.99 |

Various aberration plots for the example embodiments 1–4 are provided in FIGS. 2A–2C, 4A–4C, 6A–6C, and 8A–8C, respectively, wherein FIGS. 2A, 4A, 6A, and 8A show spherical aberration, FIGS. 2B, 4B, 6B, and 8B show astigmatism, and FIGS. 2C, 4C, 6C, and 8C show distortion. These aberrations pertain to image-formation aberrations of the respective eyepiece lens when a beam of light is incident on the eyepoint side of the eyepiece lens. Spherical aberration and astigmatism are measured using d-line light. Dashed lines in FIGS. 2A, 4A, 6A, and 8A indicate sine conditions. In FIGS. 2B, 4B, 6B, and 8B, dashed lines pertain to meridional astigmatism, and solid lines pertain to sagittal astigmatism. In FIGS. 2A, 4A, 6A, and 8A, $F_{NO}$ denotes the F number; in FIGS. 2B, 2C, 4B, 4C, 6B, 6C, 8B, and 8C, ω indicates the angle of view. As is evident from FIGS. 2, 4, 6, and 8, aberrations in each example embodiment are corrected favorably.

Therefore, the present invention provides an eyepiece lens having an apparent field of view of more than 60 degrees, preferably more than 70 degrees, and exhibits an eye relief that is more than 80 percent of the focal length of the eyepiece lens. The eyepiece lens also exhibits a favorable correction of various aberrations, including spherical aberration, astigmatism, and distortion up to the perimeter of the apparent field of view of the eyepiece lens.

Whereas the invention has been described in connection with preferred and example embodiments, it will be understood that the invention is not limited to those embodiments. On the contrary, the invention is intended to cover all alternatives, modifications, and equivalents as may be included within the spirit and scope of the invention as defined by the appended claims.

What is claimed is:

1. A wide-field eyepiece lens, comprising, in order from an objective side, a first cemented lens, a second cemented lens, a first positive lens element, and a second positive lens element, the eyepiece lens having a focal length and exhibiting an eye relief of more than 80 percent of the focal length at an apparent field of view of more than 60 degrees, the eyepiece lens having no intermediate image plane within the eyepiece lens and being positionable, during use, closer to a user's eye than to a real-image plane of an objective lens with which the eyepiece lens is used.

2. An eyepiece lens usable together with an objective lens for viewing an object, the eyepiece lens comprising, in order from the objective side, a first cemented lens, a second cemented lens, a first positive lens element, and a second positive lens element, the eyepiece lens having no intermediate image plane and being positionable, during use, closer to a user's eye than to a real-image plane of an objective lens with which the eyepiece lens is used, and the eyepiece lens having an overall focal length F and an overall length D.

3. The eyepiece lens of claim 2, exhibiting an eye relief of more than 0.8 F at an apparent field of view of more than 60 degrees.

4. The eyepiece lens of claim 3, exhibiting an apparent field of view of more than 70 degrees.

5. The eyepiece lens of claim 2, wherein the first cemented lens consists, in order from the objective side, of a negative lens element cemented to a positive lens element, and the second cemented lens consists, in order from the objective side, of a positive lens element cemented to a negative lens element.

6. The eyepiece lens of claim 5, wherein the first cemented lens includes a lens surface situated closest to the objective side of all lens surfaces of the first cemented lens, and a lens surface situated closest to the eye side of all lens surfaces of the first cemented lens, the lens surface situated closest to the objective side being concave with respect to the objective side or planar and having a radius of curvature $R_1$, and the lens surface situated closest to the eye side having a radius of curvature $R_3$, the eyepiece lens satisfying the following conditions:

$-0.7 \leq F/R_1 \leq 0$, $-1.0 \leq F/R_3 \leq 0$, $|R_3|/|R_1| \leq 1.4$, and $D/F \leq 2$.

7. The eyepiece lens of claim 6, further satisfying the condition:

$-0.6 \leq F/R_1 \leq 0$.

8. The eyepiece lens of claim 6, further satisfying the condition:

$-0.8 \leq F/R_3 \leq -0.3$.

9. The eyepiece lens of claim 6, further satisfying the condition:

$|R_3|/|R_1| \leq 1.15$.

10. The eyepiece lens of claim 5, wherein the first positive lens element has a focal length $F_3$ and a convex surface oriented toward the objective side; the second positive lens element has a focal length $F_4$ and a convex surface oriented toward the objective side; the first cemented lens has a cemented surface having a radius of curvature $R_2$; and the second cemented lens has a lens surface with radius of curvature $R_4$ that is situated closest to the objective of all lens surfaces of the second cemented lens, and a cemented surface having a radius of curvature $R_5$, the eyepiece lens further satisfying the following conditions:

$0.35 \leq F/R_2 \leq 1.3$, $-1.3 \leq F/R_5 \leq -0.3$, $2.5 \leq |R_4|/F$, $0.2 \leq F/F_4 \leq 0.7$, and $0.3 \leq F_3/F_4 \leq 8.5$.

11. The eyepiece lens of claim 10, further satisfying the condition:

$0.35 \leq F/R_2 \leq 1.1$.

12. The eyepiece lens of claim 10, further satisfying the condition:

$-1.1 \leq F/R_5 \leq -0.35$.

13. The eyepiece lens of claim 10, further satisfying the condition:

$4 \leq |R_4|/F$.

14. The eyepiece lens of claim 10, further satisfying the condition:

$0.5 \leq F_3/F_4 \leq 4$.

15. The eyepiece lens of claim 2, wherein the first cemented lens consists, in order from the objective side, of a negative lens element cemented to a positive lens element, and the second cemented lens consists, in order from the objective side, of a negative lens element cemented to a positive lens element.

16. The eyepiece lens of claim 15, wherein the first cemented lens includes a planar or objective-side-facing concave lens surface, situated closest to the objective side of all lens surfaces of the first cemented lens, having a radius of curvature $R_1$; and a lens surface, situated closest to the eye side of all lens surfaces of the first cemented lens, having a radius of curvature $R_3$, the eyepiece lens satisfying each of the following conditions:

$-0.7 \leq F/R_1 \leq 0$, $-1.0 \leq F/R_3 \leq 0$, $|R_3|/|R_1| \leq 1.4$, and $D/F \leq 2$.

17. The eyepiece lens of claim 15, wherein the first positive lens element has a focal length $F_3$ and a convex surface oriented toward the objective side; the second positive lens element has a focal length $F_4$ and a convex surface oriented toward the objective side; the first cemented lens has a cemented surface having a radius of curvature $R_2$; and the second cemented lens has a lens surface with radius of curvature $R_4$ that is situated closest to the objective of all lens surfaces of the second cemented lens, and a cemented surface having a radius of curvature $R_5$, the eyepiece lens further satisfying the following conditions:

$$0.3 \leq F/R_2 \leq 1.3,$$

$$0.3 \leq F/R_5 \leq 1.3,$$

$$2.5 \leq |R_4|/F,$$

$$0.2 \leq F/F_4 \leq 0.7,$$

and $$0.3 \leq F_3/F_4 \leq 8.5.$$

18. The eyepiece lens of claim 17, further satisfying the condition:

$$0.35 \leq F/R_5 \leq 1.1.$$

19. The eyepiece lens of claim 6, wherein the first positive lens element has a focal length $F_3$ and a convex surface oriented toward the objective side; the second positive lens element has a focal length $F_4$ and a convex surface oriented toward the objective side; the first cemented lens has a cemented surface with a radius of curvature $R_2$; the second cemented lens has a cemented surface with a radius of curvature $R_5$ and a lens surface with radius of curvature $R_4$ that is situated closest to the objective of all lens surfaces of the second cemented lens, the eyepiece lens further satisfying the conditions:

$$0.3 \leq F/R_2 \leq 1.3,$$

$$-1.3 \leq F/R_5 \leq -0.3,$$

$$2.5 \leq |R_4|/F,$$

$$0.2 \leq F/F_4 \leq 0.7,$$

and $$0.3 \leq F_3/F_4 \leq 8.5.$$

20. The eyepiece lens of claim 16, wherein the first positive lens element has a focal length $F_3$ and a convex surface oriented toward the objective side; the second positive lens element has a focal length $F_4$ and a convex surface oriented toward the objective side; the first cemented lens has a cemented surface having a radius of curvature $R_2$; and the second cemented lens has a lens surface with radius of curvature $R_4$ that is situated closest to the objective of all lens surfaces of the second cemented lens, and a cemented surface having a radius of curvature $R_5$, the eyepiece lens further satisfying the following conditions:

$$0.3 \leq F/R_2 \leq 1.3,$$

$$0.3 \leq F/R_5 \leq 1.3,$$

$$2.5 \leq |R_4|/F,$$

$$0.2 \leq F/F_4 \leq 0.7,$$

and $$0.3 \leq F_3/F_4 \leq 8.5.$$

* * * * *

UNITED STATES PATENT AND TRADEMARK OFFICE
CERTIFICATE OF CORRECTION

PATENT NO. : 5,774,270

DATED : June 30, 1998

INVENTOR(S) : Mitsuhiro Yanari

It is certified that error appears in the above-identified patent and that said Letters Patent is hereby corrected as shown below:

In the Claims:

Column 10, line 10, "$0.35 \leq F/R_2 \leq 1.3$" should be --$0.3 \leq F/R_2 \leq 1.3$--.

Signed and Sealed this

Twenty-second Day of June, 1999

Q. TODD DICKINSON

*Attest:*

*Attesting Officer*    Acting Commissioner of Patents and Trademarks